United States Patent
Mühlfeld et al.

(10) Patent No.: US 10,744,997 B2
(45) Date of Patent: Aug. 18, 2020

(54) METHOD FOR OPTIMIZING DATA IN DETERMINING OPERATING STRATEGIES OF THE MOTOR VEHICLE

(71) Applicant: AUDI AG, Ingolstadt (DE)

(72) Inventors: Florian Mühlfeld, Kürnach (DE); Boris Blasinski, Gaimersheim (DE)

(73) Assignee: AUDI AG, Ingolstadt (DE)

( * ) Notice: Subject to any disclaimer, the term of this patent is extended or adjusted under 35 U.S.C. 154(b) by 142 days.

(21) Appl. No.: 15/504,843

(22) PCT Filed: Jul. 3, 2015

(86) PCT No.: PCT/EP2015/001350
§ 371 (c)(1),
(2) Date: Feb. 17, 2017

(87) PCT Pub. No.: WO2016/026546
PCT Pub. Date: Feb. 25, 2016

(65) Prior Publication Data
US 2017/0267227 A1 Sep. 21, 2017

(30) Foreign Application Priority Data
Aug. 19, 2014 (DE) ........................ 10 2014 012 319

(51) Int. Cl.
*B60W 20/12* (2016.01)
*B60W 50/00* (2006.01)
(Continued)

(52) U.S. Cl.
CPC ............ *B60W 20/12* (2016.01); *B60W 20/11* (2016.01); *B60W 20/15* (2016.01);
(Continued)

(58) Field of Classification Search
CPC .. B60W 20/12; B60W 20/11; B60W 50/0097; B60W 2550/22; B60W 2550/20;
(Continued)

(56) References Cited

U.S. PATENT DOCUMENTS 9,266,443 B2 * 2/2016 Payne ................. B60L 11/1861
2010/0010697 A1 * 1/2010 Soma ..................... B60K 6/445
701/22

(Continued)

FOREIGN PATENT DOCUMENTS

CN            103328931 A      9/2013
DE            19831487 C1      3/2000
(Continued)

OTHER PUBLICATIONS

Translation of DE102010039653A1—obtained via EspaceNet on Aug. 12, 2019 (Year: 2012).*

(Continued)

*Primary Examiner* — Jeffrey C Boomer
(74) *Attorney, Agent, or Firm* — Maier & Maier, PLLC

(57) ABSTRACT

A method for operating a motor vehicle. To determine a total operating strategy, predictive basic data describing the operation of the motor vehicle for a known route is determined from input data comprising route data. The operating strategies of the motor vehicle are evaluated based on the predictive basic data in order to determine the total operating strategy. The motor vehicle is then operated according to the total operating strategy. To determine the basic data, a performance profile is determined based on the total required performance of the vehicle throughout the route. The route is divided into route sections, each assigned characterizing performance information. Successive route sections are combined into a common segment when at least one similarity criterion is satisfied comparing the perfor- (Continued)

mance information of the route sections. Thereafter, the segments are provided with this assigned total performance information associated with the total performance information.

16 Claims, 3 Drawing Sheets

(51) Int. Cl.
  *B60W 20/11* (2016.01)
  *B60W 20/15* (2016.01)
(52) U.S. Cl.
  CPC ..... *B60W 50/0097* (2013.01); *B60W 2540/30* (2013.01); *B60W 2555/20* (2020.02); *B60W 2555/60* (2020.02); *B60W 2556/50* (2020.02)
(58) Field of Classification Search
  CPC ......... B60W 2550/12; B60W 2540/30; B60W 2550/402
  See application file for complete search history.

(56) References Cited

U.S. PATENT DOCUMENTS

| | | | | |
|---|---|---|---|---|
| 2011/0313647 | A1* | 12/2011 | Koebler | B60L 15/2045 701/123 |
| 2013/0166116 | A1* | 6/2013 | Chen | B60L 3/12 701/22 |
| 2014/0046592 | A1 | 2/2014 | Christ et al. | |
| 2018/0222479 | A1* | 8/2018 | Wunderlich | B60W 50/08 |

FOREIGN PATENT DOCUMENTS

| | | | |
|---|---|---|---|
| DE | 102008015046 A1 | 9/2008 | |
| DE | 102009046568 A1 | 5/2011 | |
| DE | 102010041616 A1 | 10/2011 | |
| DE | 102010039653 A1 * | 2/2012 | ................ B60L 1/00 |
| DE | 102012001740 A1 | 8/2013 | |
| DE | 102012011996 A1 | 12/2013 | |
| EP | 2071285 A1 | 6/2009 | |
| EP | 2620343 A2 | 7/2013 | |
| WO | 2015019142 A1 | 2/2015 | |

OTHER PUBLICATIONS

German Office Action dated Jun. 1, 2015 of corresponding application No. 10 2014 012 319.7; 6 pgs.

International Search Report dated Oct. 7, 2015 of corresponding application No. PCT/EP2015/001350; 11 pgs.

Office Action dated Jun. 4, 2018 in corresponding Chinese Application No. 201580044667.4; 20 pages.

Notification of Transmittal of Translation of the International Preliminary Report on Patentability (Chapter I or Chapter II) dated Mar. 2, 2017, in connection with corresponding International Application No. PCT/EP2015/001350 (8 pgs.).

Chinese Office Action dated Feb. 27, 2019, in connection with corresponding CN Application No. 201580044667.4 (18 pgs., including machine-generated English translation).

* cited by examiner

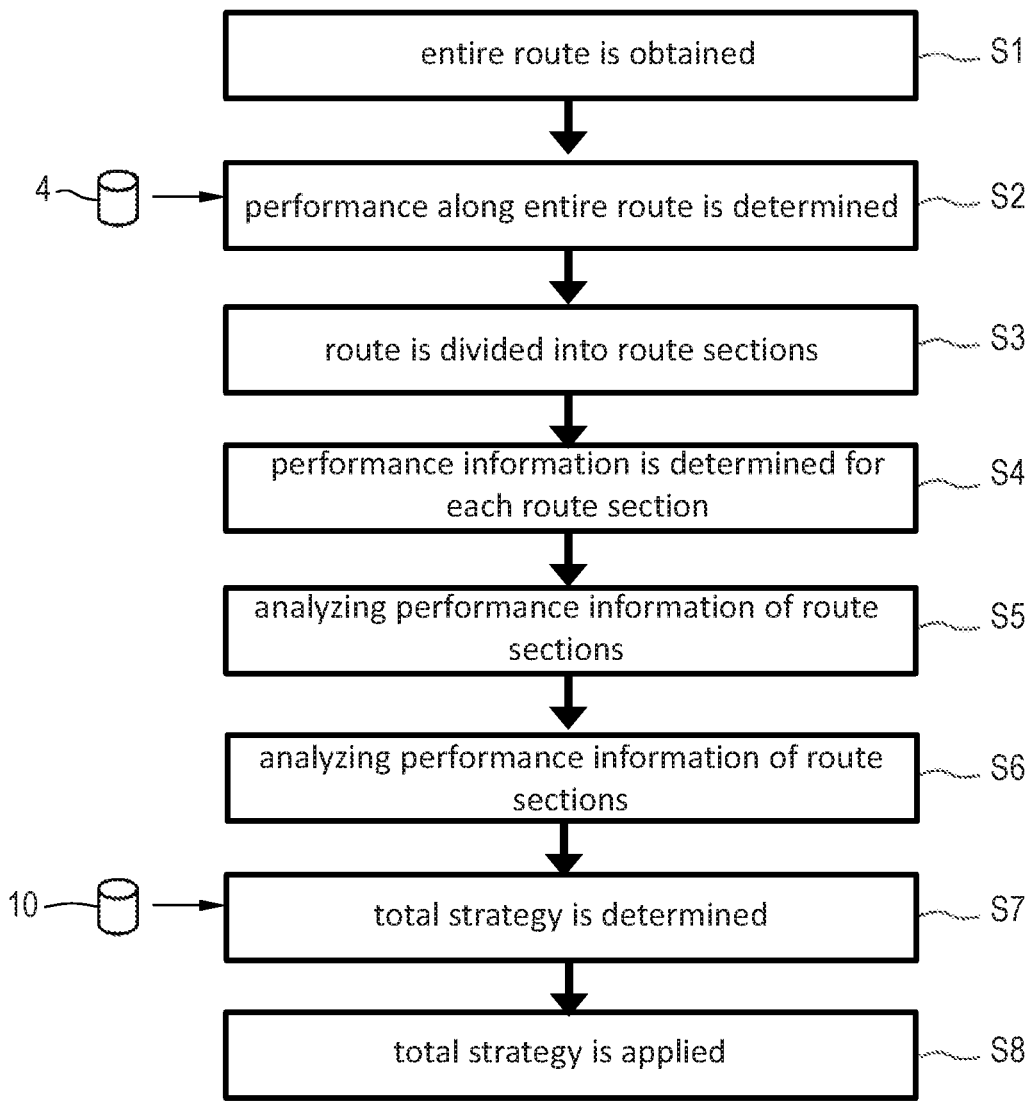
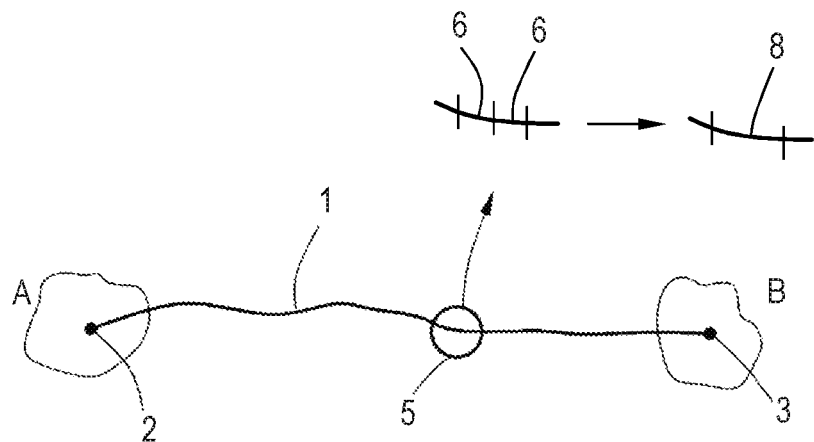

METHOD FOR OPTIMIZING DATA IN DETERMINING OPERATING STRATEGIES OF THE MOTOR VEHICLE

BACKGROUND

The invention relates to a method for operating a motor vehicle, wherein in order to determine a total strategy, required basic data predictively describing the operation of the motor vehicle is determined for a route known in advance from input data comprising route data, the operating strategy of the motor vehicle is evaluated for determination of the total strategy based on the basic data and the vehicle is operated according to the total operating strategy.

With modern motor vehicles, situations occur when it is already known which route the motor vehicle will be traveling on during the consequent operation. Similar route data can originate for example from a navigation system of the motor vehicle, which determines a course of travel starting from a current position of the motor vehicle up to a destination location. This kind of accurate information about future routes to be traveled on with the vehicle can be used in order to plan in advance a total operating strategy to be applied to at least one component of the motor vehicle, which can be composed of partial strategies applied to different components of the route and optimized based on a certain criterion and then carried out while driving on a route that is known in advance.

An example of such planning in advance of an total operating strategy is a strategy for hybrid vehicles, in particular for so-called plug-in hybrids. These vehicles are provided with a fuel reservoir that is used as an energy storage device, and with a battery, with which can be powered by an internal combustion engine and an electromotor of the vehicle. A total operating strategy for such a hybrid motor vehicle can comprise a number of different partial strategies, which may include an operating mode or several operating modes, as well conditions for their concrete application. For example, an operating mode can be provided in which the motor vehicle can be operated purely electrically, another operating in which the motor vehicle is operated without charging the battery, and a third operating mode in which the motor vehicle is operated with a targeted charging of the battery by the internal combustion motor, and a fourth operating mode in which the electromotor is operatively supported by the internal combustion engine. Partial operating strategies and/or the total operating strategy can contain priorities for individual operating mode and for example aim at maintaining constant the activation criteria for the activation of individual operating modes and for example aim at increasing the charging status of the battery powering one of the electromotors constant or at increasing it to a certain extent, or to use the electromotor as much as possible and the like. In order to determine a total operating strategy, it can be therefore specified when and which partial strategies should be used during the course of the route that is known in advance, or portions of the route can be directly assigned to an operation mode. The goal of optimization of such a total strategy can be for example that the battery should be emptied with the lowest possible consumption of fuel upon arrival to the destination, where it can be charged again. It goes without saying that combinations of several/other optimization goals are also conceivable.

The operating strategy of a plug-in hybrid vehicle can thus also for example influence how fast the energy from the battery is used up during the traveling, in particular depending on the priorities, for example by changing the switch-on and switch-off limits. As a rule, the goal is to use up electric energy completely until the motor vehicle arrives again to a charging facility. At the same time, however, the electric energy should be used when the electromotor is operated with the best possible efficiency and the internal combustion engine provides a relatively poor efficiency. The result of the latter can be that it may be also useful to charge the battery during a segment of the route from the internal combustion engine in order to be able to continue driving later with electric energy.

Various approaches to the use of predictive route data can be used in order to determine an operating strategy so as to achieve such optimization goals.

So for example, DE 198 31 487 C1 proposes a method for operating a battery of a hybrid drive of a motor vehicle, wherein information regarding a route to be completed is recorded and a calculation of the expected power requirements for the hybrid drive is carried out during the course of the travel route while taking into account the recorded information. The driving route is divided on the basis of the route data in order to determine an average power requirement for the components of the route so that dynamic processes are averaged. The strategy is then determine dwith a comparison of efficiency.

EP 2 620 343 A2 relates to a method for operating a hybrid drive unit for a motor vehicle, wherein the route data about a planned route to be covered is also received and a total expected power for the planned route is determined, wherein an operating strategy is then implemented for the planned route in dependence on the required total power that is expected, namely in such a way that after the completion of the route, the charging state of the battery will reach a predetermined value.

According to other known approaches, the profiles of expected power and speed are calculated from the route data and the total strategy is then optimized directly based on this.

However, there are several problems with these known method. So for example, essential information is lost during the calculation of the average values, in particular information about the distribution of the power, which leads to an inferior prediction and therefore results in a flawed total operating strategy. The calculation of the performance process per se is not very computationally intensive, but the optimization of the total operating strategy from such a performance process over the entire route definitely is. In addition, it is not possible to predict the speed profile with precision even if the general conditions are well understood, which means that a complicated optimization can produce a false result, or in an extreme case even lead to completely false results.

SUMMARY OF THE DISCLOSURE

The task of the invention is therefore to provide a basic set of data during the determination of a total operating strategy, which despite a lower computing power permits a determination of the total operating strategy with a qualitatively higher value within the context of an optimization.

In order to achieve this objective with the method according to the invention mentioned in the introduction, the performance of the vehicle is determined for determination of basic data for the entire route to be completed, the route is subdivided into route sections, characterizing performance information is associated with successive sections, and successive route sections are combined into a common segment when at least one of the similarity criteria comparing the performance information for the route sections is met, so that after that, the segments associated with this total performance information are provided as basic data.

The invention therefore proposes to determine, namely in a manner that is essentially known, a performance profile along a route that is known, while taking into account route data and possibly also other input data, wherein afterwards, in order to simplify the following calculations while preserving as much as possible of the information pertaining to the performance profile, the route is divided into individual, disjoint segments, wherein the performance profile is evaluated for each route section on the basis of the performance information. Therefore, contrary to the method known from prior art, route data or map data of a digital map are not used for dividing the route for example according to highways, country routes or the like. Instead, the route in question is subdivided on the basis of the performance profile into suitable segments having similar physical features determining the driving conduct. For this purpose, the power or performance information from adjacent sections of the driving route, which can have for example the same length, is compared, wherein within the scope of the performance information is preferably considered the performance distribution with power levels that were in fact used within these sections relating to the total energy that was required. Similarity criteria, which evaluate this comparison, make it possible to determine whether a segment separation is present between the sections of the route. When two or more sections of the route are combined, total performance information can be easily obtained by combining the performance information of the individual route sections, in particular when these are performance distribution segments. In this manner, a division of the route into segments is thus created based on a performance prediction, wherein, however, the essential information is retained as total performance information in the basic data, and the relevant performance characteristics relating to the segments are obtained.

Therefore, since the route is divided into larger route segments, a significantly reduced computing power is now required for the consequent determination of the operating strategy, while at the same time, an operating strategy having a high quality is provided because essential information is included in the performance profile as total performance information in the optimization step for determination of the total operating strategy.

At the same time, the method according to the invention can be applied particularly advantageously to a motor vehicle that is designed as a hybrid motor vehicle, wherein one total strategy is determined relating to the use of at least one electromotor and one internal combustion engine, and consequently also the total operating strategy for the operation of a hybrid drive system, comprising the electromotor and the internal combustion engine. The determination of the total operating strategy can be then carried out with optimization goals, for example for an empty battery upon reaching the location of the destination, together with the greatest possible reduction of the consumption of the motor vehicle with respect to the internal combustion engine. Once an improved database has been created for the determination of the total operating strategy, a qualitatively improved operating strategy is also achieved, so that a reduction of the consumption and an improvement of the driving experience can be achieved with the hybrid motor vehicle.

As was already mentioned, the performance profile can be essentially determined based on the technique of the types that are already known from prior art, wherein an additional determination of the speed profile is not necessary within the context of the present invention. However, it is expedient when additional data is also taken into account for the determination of the performance profile, in particular driving data describing the driving conduct of the driver and/or weather data and/or data describing the traffic situation along the route. The driving data can be in this case derived for example from the operating data of the motor vehicle, which characterizes the driving conduct and the like. Traffic data and/or weather data can be accessed in a timely manner through corresponding communication connections in the motor vehicle, for example via the internet and/or via a suitable communication channel that is used for distribution of traffic information. The advantageous consequence of the use of such additional data is that the distribution of the route into segments can take place already based on this additional data, so that this data has an influence on further calculating operations from the beginning and thus enables an improved division of the route into segments, once the division is oriented also toward the driver data and/or weather data and/or traffic data. The segmentation of the route is thus performed on the basis of the input data that is directly relevant to the total operating strategy.

According to a particularly preferred embodiment of the present invention, the energy required with a distribution into route sections is determined as performance information for at least two performance intervals, in particular as a histogram. Therefore, it is then known for the route section (and thus also as total information for the segments), which amount will be required as the performance from different performance intervals, so that the load points along the route are ultimately better known. At the same time, it goes without saying that the negative performances are also taken into account, which can be used for recuperation and thus for charging of the battery and the like. For example, a division into intervals of 40 kWh is conceivable, so that a histogram is created which describes the distribution of the power when the energy that is in fact generated is plotted in the performance intervals against these performance intervals. By specifying the total performance amount required in the performance intervals, the precise size of the variable and the amount of the power required in the performance intervals is provided, in particular with respect to a hybrid motor vehicle and the total operating strategies for hybrid drive system, which is required for a qualitatively highly valuable further evaluation obtained with an evaluation of operating strategies, and therefore in particular as segment operation strategies. In addition, similar histograms provide an ideal basis for the comparison, which is carried out as a part of the evaluation of at least one similarity criterion.

For a determination of the divisions of the route sections it is advantageous when a length of the route section that is greater than 2 km is provided. For example, the route can be thus divided into route segments having a length of 3 km each. Shorter route segments often result in problems because individual driving maneuvers, for instance while coping with steep slopes or the like, can have a disproportional influence on the performance information so that shorter segments are created than what was really necessary. In order to enable the allocation of the route sections to the segments. it is possible for example to go through the individual route section by starting with the first route section, so that a new segment can be started every time when at least one similarity criterion is not met and/or all similarity criteria are not met.

However, in this context it may be advantageous in exceptional cases to avoid a rigid division into sections having the same length, when there is a clear deviation in one part of the section, which is clearly shorter than a segment section. It can be for example provided that a partial adjustment of the division into route sections is created due to section data and/or map data of a digital map, provided that this is a particularly short trip through a residential area to which an exceptional criterion is applicable. This is because trips that lead through residential areas are often planned as shorter trips so as to reach a main street soon. That is why it is quite possible to encounter, for example at the beginning or at the end of the trip, a part of it that will lead through a residential area, for example with a 30 miles zone, which is significantly shorter than the anticipated length of a route section, for example only some 100 meters, while the route section has been set to 3 km. In such circumstances, clearly representing an exceptional case, the classification can be based only on the performance profile and it can take into account route data or map data, for example the boundaries the 30-mile zone or the like. In this manner, even short route sections deviating from their performance profiles can be registered.

For a concrete design of the allocation of the common segments with the similarity criterion, statistical variables can be provided, which are contained in the performance information and/or the variables derived from these are evaluated. This is especially suitable when a histogram is used, (which already represents a type of statistic evaluation), which describes the performance distribution in the performance intervals. It can then be provided, for example, that an average performance is used as a variable on the route sections, and/or also a maximum performance on the route sections and/or an applicable size of the of the envelope of a histogram of performances. The shape of a histogram, the upper limit of the histogram, as well as the average performance can be therefore considered indications as to whether the route sections are sufficiently similar to correspond to the same conduct so that they can then be assigned to the same segment. For example, a maximum deviation from the average performance can be specified as a similarity criterion, wherein it is also very useful when the maximum performance on the route section is also considered. It happens frequently that certain performance intervals do not occur in certain environments or with a certain driving conduct, for high performance peaks example in a 30-mile zone or the like. A similarity criterion can be also created in such a way that when a certain maximum performance is not exceeded in a previous route section, this should be also applied to the next route section and the like. Finally, the shape of the histogram, which is to say the actual distribution of the performance levels, provides a clear indication of a similar driving conduct in both sections of the route, wherein a corresponding statistical value describing a histogram can then be evaluated.

After the division into segments has been created and the total performance information is available, in particular again as a histogram indicating the distribution of the performance, the total operating strategy is determined on the basis of this basic data, wherein it can be provided that in order to determine the total operating strategy, segment operating strategies are evaluated for different segments on the basis of particular performance distribution and/or the total performance information describing different load points for respective segments and the total operating strategy is determined with optimization based on the evaluation. In this case, certain optimization goals are prescribed, for example, as was already mentioned, as low level of consumption as possible or the like. At the same time, the optimization, or the determination of the total strategy in general, may include also other information, for example map data of a digital map applied to the segments and the like, for example other segment operating strategies with a hybrid motor vehicle in environmental zones, and therefore also a preference for certain operating modes, which can be more advantageous than taking into consideration only the segment strategies resulting from the total performance information. Segment operating strategies thus relate to the realization of certain operating modes, for example "purely electric driving", "driving only with the internal combustion engine", "charging the battery of the electromotor with the internal combustion engine" and the like, wherein a segment operating strategy may comprise also only one operating mode ("purely electric driving"), or wherein operating mode can be excluded ("no charging of the battery from the internal combustion engine"). The operating strategy with a hybrid drive system can result for example in switch-on and/or switch-off limits for the motors, which in turn can lead to prioritization (for example, a high priority can be assigned to purely electric driving, a low priority can be assigned the use of the internal combustion engine). Segment operating strategies can in this case be also turned off until a desired goal is achieved, for example "stop charging the battery powering the electromotor" or the like. In particular, the segment operating strategies may not be formulated discretely, but instead, they can result also from priorities determined for certain modes of operation and the like.

It should be still noted in this connection that the method according to the invention can be applied not only to the operation of a hybrid system in a hybrid motor vehicle, but also to the total operating strategy of other components of the motor vehicles, for example to the operation of a soot particle filter in a motor vehicle, as its performance can be dependent on different operating parameters and also on the performance levels that are present. The targets for optimization in such a case may be for example the lowest possible emission of pollutants and/or the smallest possible energy consumption of the soot particle filter.

There are several possibilities for a concrete evaluation within the context of optimization. If the method is used for a total operating strategy of a hybrid drive system, it is possible to consider for operating modes to be used for example purely electric driving, driving only with an internal combustion engine, a supplementary connection of the electromotor to the internal combustion engine and targeted charging of the battery with energy obtained from the internal combustion engine, or segment operating strategies that are derived from these strategies. If the total performance information indicates that a small average performance and a smaller higher performance component is obtained, for example while driving through a residential area, the result of the known circumstances is that the operating mode "pure electric driving" will be used with a high efficiency, and that it will result in a high evaluation and possibly a high priority score; while driving only with the internal combustion engine would lead for example to a lower efficiency, so that the operating mode (and thus also the segment operation strategies used extensively within it) would be rated lower. Symmetrical trips on the highway, for example with a speed limit, lead to performance level distributions with an average performance level without strong performance deviations, so that such a segment is particularly suitable for charging of the battery with the internal combustion engine, or for driving with the internal combustion engine with efficient consumption if charging is not required. When driving very fast on a highway that has no speed limit, segment operation strategies that in general only use the internal combustion engine can be preferred, although the electromotor can be also switched in order to achieve particularly high performance levels. Different possibilities are conceivable for a concrete implementation of such evaluation criteria, which are evident to a person skilled in the art and which will not be described here in detail.

In addition to the method, the invention also relates to a motor vehicle, which is provided with a control device designed for carrying out the method according to the invention. Various embodiments relating to the method according to the invention can be analogously applied to the motor vehicle according to the invention, so that the same advantages can be obtained with the vehicle as those mentioned above. In particular, the motor vehicle may be a hybrid motor vehicle that is provided with a hybrid drive system, which contains at least one internal combustion engine, as well as energy sources associated with it.

Finally, the invention also relates to a computer program, which carries out the steps according to the invention, and which is executed on a computing device. The computing device can be for example the control device of the motor vehicle already mentioned above. The embodiments mentioned so far can be also applied to the computer program. The program can be stored for example on a non-transient data carrier, for example a CD-ROM.

BRIEF DESCRIPTION OF THE DRAWINGS

Further advantages and details of the present invention will become evident from the exemplary embodiments described below, as well as from the attached figures. The figures show the following:

FIG. 1 a flowchart of an embodiment of the method according to the invention, FIG. 2 a route to be traveled, known in advance, FIG. 3 performance information for a route section, FIG. 4 total performance information for a first segment, FIG. 5 total performance information for a second segment, FIG. 6 the charging state of a battery of the electromotor for a route FIG. 7 a motor vehicle according to the invention.

DETAILED DESCRIPTION OF THE DRAWINGS

Figure 3:
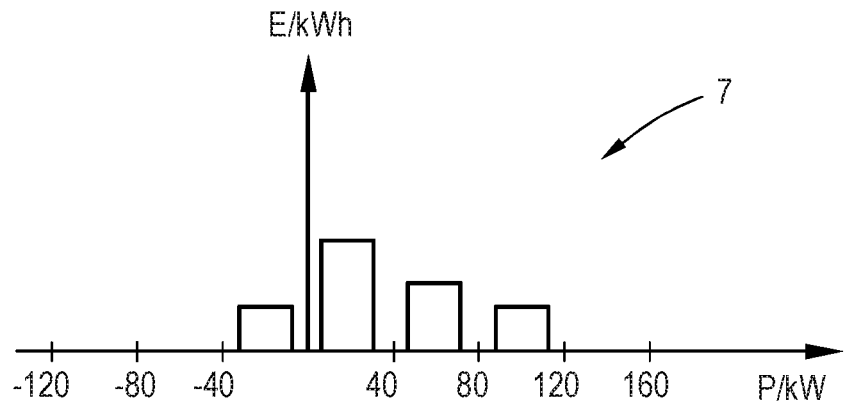

FIG. 1 shows a flowchart of an exemplary embodiment of the method according to the invention, designed to determine and carry out the total operating strategy for a hybrid operating system of a vehicle. For this purpose, route data is provided describing a route that is already known, in particular from a navigation system of the vehicle, for a route that is to be covered by the motor vehicle. FIG. 2 shows by way of an example such a route 1, which is known in advance, and which starts from a starting point 2 in a location A and leads to a destination location 3 in a destination location B while passing through very different types of roads, for example so that it begins in a residential area, then continues on main streets within the location A, leads through a country road to the freeway, along which it crosses portions with a speed limit and portions without a speed limit, as well as hilly portions or portions with only a few hills, and in location B then continues again on main streets and then traverses again residential areas to end in the destination location 3.

In a step S2, the performance along the route 1 is determined as shown again in FIG. 1, while indicating how much power (wheel power) will have to be applied to the wheels of the motor vehicle 1 so that the route 1 can be completed. In this case, negative performance levels can be of course also contained, for example when the vehicle is being driven down the hill or during a braking operation. In this determination of the performance profile are contained also additional data 4, which include in the present case driver data, weather data and traffic data. The traffic data describe the driving conduct of the driver, the current weather conditions along the route 1 and the traffic data about the traffic information, in particular the flow of the traffic along the route 1. This enables an improved prediction of the performance flow.

In a step S3, the route 1 is divided into route sections, which is to say units which in the present case should all have a length of 3 km. This is shown schematically in an enlarged area 5 in FIG. 2 for successive route sections 6. However, it should be pointed out that exceptions to these regular divisions can be determined based upon exceptional criteria, for example when it is evident from the route data or from the map data of a digital map that one part of the route 1, which is shorter than 3 km, is characterized by clearly different conditions, for example in a 30-mile zone. The length of the section of the route can then be adjusted also under these circumstance.

In a step S4, performance information is determined for each route section of the entire route 1 from the performance curve. This performance information indicates in the present case in the form of a histogram how important is the contribution of which performance intervals to the required total energy for the route section 6 shown in FIG. 3. An example of such performance information is illustrated in FIG. 3, in which the energy is plotted against the performance in different intervals, comprising in the present case 40 kW. The performance information in FIG. 3 relates to a route section in a residential area, so that in general very low performance levels dominate, which means that the average performance is low and only very few high performance levels occur and the maximum performance is also rather low.

The performance information thus ultimately represents a distribution of performance during the handling of each route section 6, and thus it simplifies the performance curve of the step S3, while it still contains the essential information.

The performance information 7 of the various route sections 6 are then used in a step S5 in order to determine whether the successive route sections 6 themselves do or do not belong to the same segment of the route 1. For this purpose, similarity criteria are considered, which are based on a comparison to the adjacent route sections 6, wherein in the present case, the average performance levels may not deviate very strongly from each other and should have similar maximum performance levels. Further, the envelope of the histogram is also considered as its form. Depending on the concrete configuration of the similarity criteria, it can be sufficient when one similarity criterion is satisfied so that it is then not necessary for another one, let alone all the other criteria, to be met. If a similarity is provided, the conclusion is that due to the similarity of the performance information, another similar driving conduct is also present and the successive route sections 6 themselves are assigned to the same segment, as indicated schematically by the segment 8 shown in FIG. 2. If the similarity is not present, a new segment 8 is started with the next route section segment 8, after the route section segments 6 have been successively traversed.

All the parts of the short route sections 6 are thus combined into a longer segment 8.

Total performance information is then determined for these segments 8 in a step S6, which is in the present case obtained with a simple summation of the individual histograms. This is because the data contained in the base data are ideal data for the consequent determination of the total strategy, so that they are available as total performance information in addition to the data that is assigned to segment 8 after the completion of the step S6 as base data.

Figure 4:
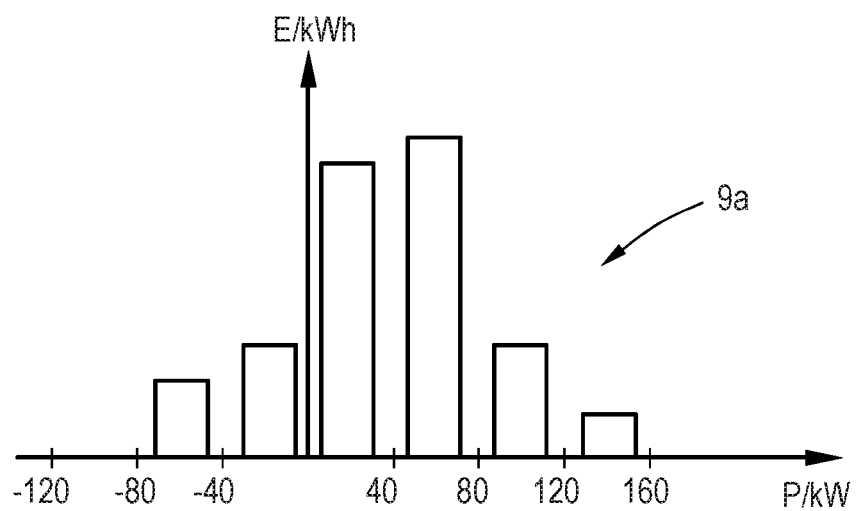

In a step S7, the total strategy is determined on the basis of the basic data, which comprises the segments 8 and the total performance information, wherein different possible segment operation strategies, for example those relating to an operating strategy, are evaluated in the different segments 8. If, for example, a total performance profile is present in a segment 8 according to the type of the performance profile 7, the usefulness of an operating state in which only the electromotor is set to a high level, for example by assigning a high value (priority) to it. The use of the internal combustion engine for an operating mode or even for the charging of the battery with the internal combustion engine will receive a low value (priority). FIG. 4. shows an example of total performance information 9a, which can occur in the case of a highway that has a speed limit. It is evident that a medium height is provided with an average performance level, so that an operation with the internal combustion engine, which has a high efficiency, will receive a high value; while a particularly high value is created also for charging of the battery of the electromotor with the internal combustion motor, therefore resulting in a high priority for charging or for permitting charging per se. Such segments 8 are particularly suitable when the battery needs to be recharged during the trip.

Figure 5:
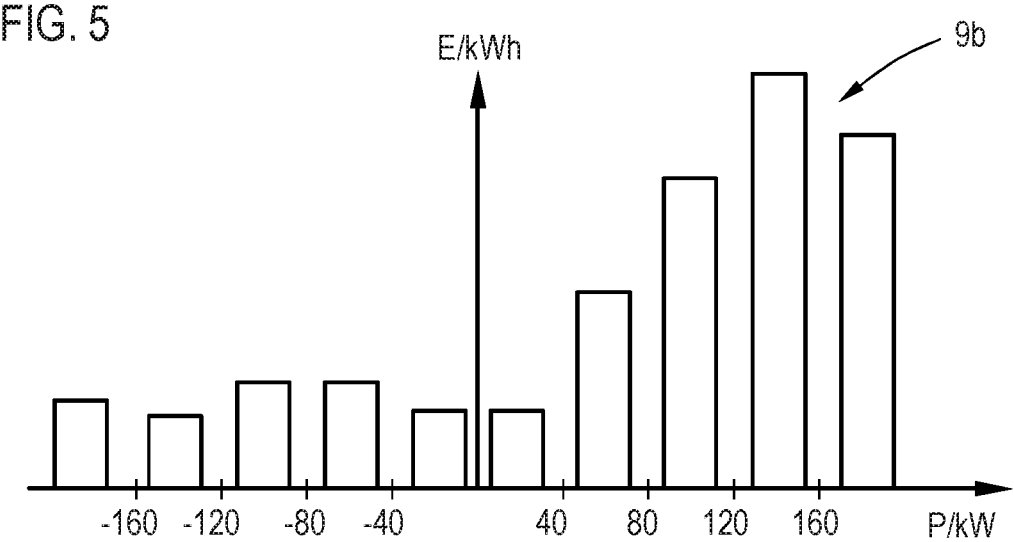

FIG. 5 shows total performance information 9b, which may occur on a highway without a speed limit when the motor vehicle is driven at full speed. It is evident that a very high average value is created for the performance here and that there is a high proportion of higher performance levels, so that an operation mode only with the electromotor will receive a very low value, although it is still sometime still taken into consideration for an operating mode, so that the electromotor can partially support the internal combustion engine.

At the same time, binary decisions can be also made within the context of the evaluation, for example as to whether charging of the battery from the internal combustion engine should or should not be permitted. It should be also pointed out that other data 10 are also taken into consideration in step S7, for example additional information about segments 8, for instance whether this is a segment including an environmental zone, in which the value of driving only with the electromotor can be increased still higher and the like.

By way of an example, it will now be briefly summarized in the Table below for the route 1 which segments 8 can be encountered, how they can be described by way of an example, which priorities are provided for the purely electric driving (E priority), and whether charging should or should not be permitted.

| Segment | Description | E-Priority | Charging |
|---|---|---|---|
| I | Residential area | High | No |
| II | Main street | Medium | No |
| III | Highway (free) | Low | No |
| IV | Highway (120 km/h) | Low | Yes |
| V | Highway (free) | Low | No |
| VI | Highway (congested) | High | No |
| VII | Main street | Medium | No |
| VIII | Environmental zone | Extra high | No |

Figure 6:
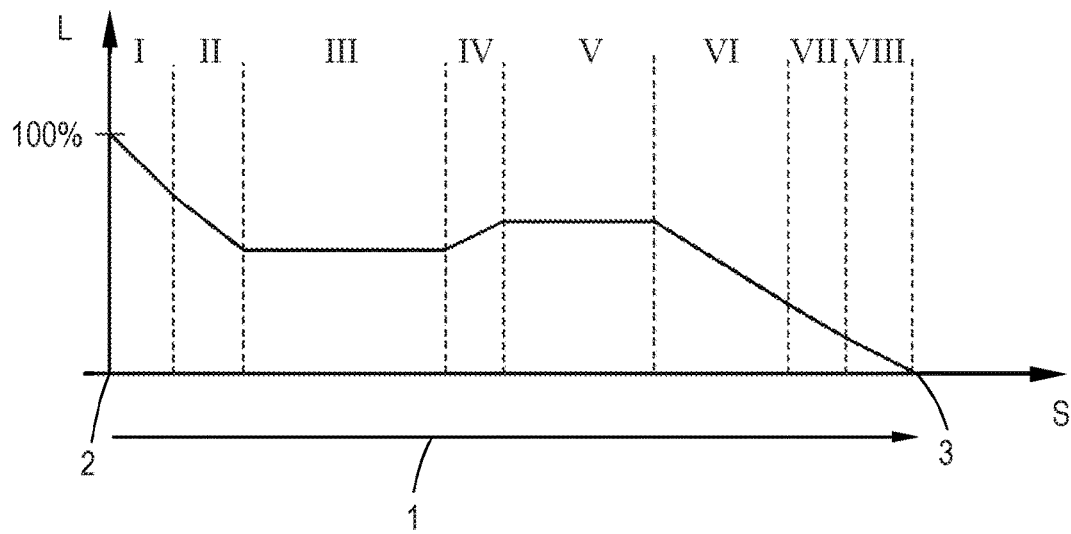

If one now considers the optimization goals, for example including the requirement that the charge status of the battery should be as low as possible at the end of the trip and the consumption of the internal combustion engine should be optimized, a total operating strategy is obtained based on the selection or construction thereof, for example from values for operating modes when only one operating mode is to be used for a segment strategy, for segment operation strategies, for example, that only the electromotor will be used for driving in segments I and I, only the internal combustion engine will be used in segment III, the battery will be charged with the internal combustion engine in segment IV, driving will be performed again only with the internal combustion engine in segment V, and driving will be performed again with the electromotor in segments VI, VII and VIII. This results in a charging status curve of the battery of the electromotor such as the one shown in FIG. 6. As shown in the figure, the charging status of the battery is plotted against the length of the route, which is divided into segments I through VIII for illustration purposes. It is evident that the optimization goal of having an empty battery is achieved when the location of the target destination 3 is reached; and this occurs with as low consumption of the fuel for the internal combustion engine as possible. In order to achieve this goal, a contributing factor is that an operating strategy is selected and implemented in the segment III and V, which aims at maintaining the current charging status of the battery supplying power for the electromotor.

In step S8, the total operating strategy determined in step S7 is then accordingly implemented by controlling the hybrid drive of the system.

Figure 7:
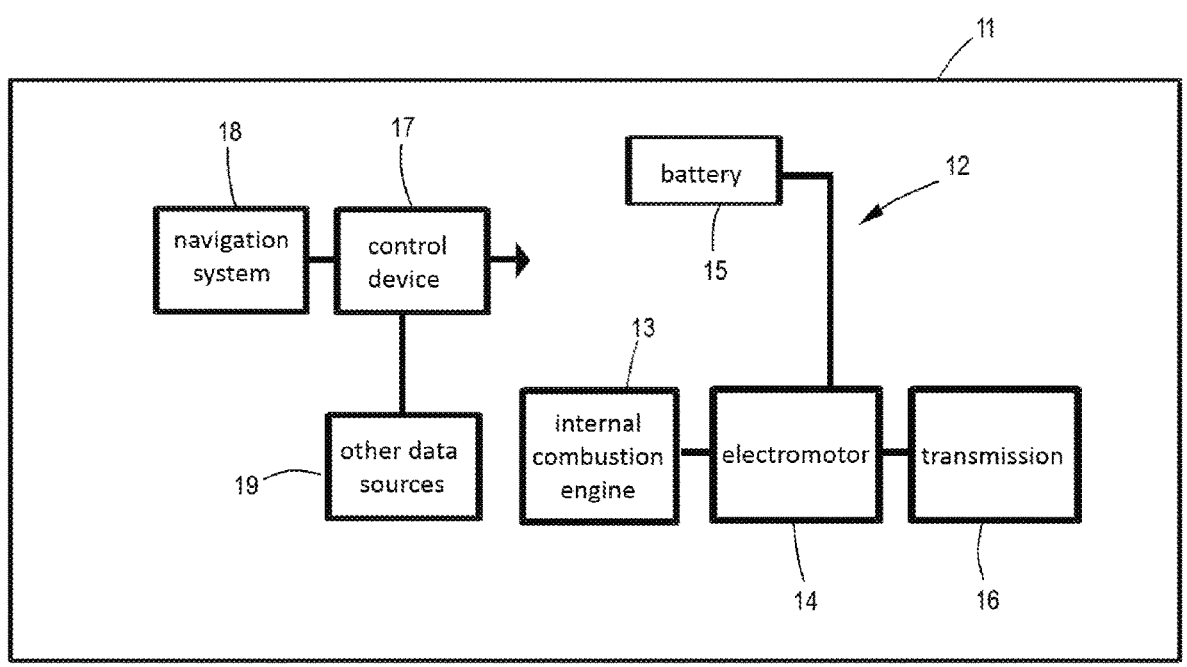

Finally, FIG. 7 shows a principle diagram of a motor vehicle 11 according to the invention, in the present case a hybrid motor vehicle. It thus comprises a hybrid drive system 12 with an internal combustion engine 13 and an electromotor 14, wherein the electromotor 14 can be powered by a battery 15. The drivetrain is completed with the transmission 16. A control device 17, which is designed for carrying out the method according to the invention, is provided in the motor vehicle 11 in order to control the operation of the hybrid operation system 12, for which purpose it is in particular connected with a navigation system 18 and other data sources 19.

The invention claimed is:

1. A method for operating a motor vehicle in order to determine a total operating strategy, comprising:
    defining a plurality of route sections out of a route that is known in advance;
    characterizing performance information for each route section;
    assigning the performance information to the each route section;
    combining successive route sections in the plurality of route sections into one or more common segments when at least one comparison criterion is met for the performance information of the successive route section;

summing the performance information of the successive route section for total performance information;

associating one or more common segments with the total performance information;

putting, in basic data, the one or more common segments associated with the total performance information;

determining a performance profile for completing the route, the performance profile including a total required performance of the motor vehicle throughout the entire route;

determining the basic data based on the performance profile required for and predictive of the operation of the motor vehicle for the route;

evaluating operating strategies of the motor vehicle based on the basic data for determination of a total operating strategy; and operating the motor vehicle according to the total operating strategy, wherein the performance information includes, in a form of a histogram, a distribution of at least one energy information required over at least two performance intervals for at least one of the route sections, wherein the at least one comparison criterion used to evaluate route sections in the plurality of route sections comprises at least one statistical variable, and wherein the statistical variable is contained in the performance information or derived from the performance information, and wherein the at least one comparison criterion comprises at least one variable representing an average performance on the route section or the at least one variable representing a maximum performance on the route section, wherein the at least one variable representing average performance or representing maximum performance is derived from performance levels and envelope in the histogram, which is provided as the distribution of the at least one energy information in the histogram.

2. The method according to claim 1, wherein the motor vehicle is a hybrid motor vehicle, and wherein determination of the total operating strategy to be employed is based on at least one of use of an electromotor and use of an internal combustion engine.

3. The method according to claim 1, wherein the performance profile is further determined based on at least one of driver data describing a driving conduct of a driver, and weather data and traffic data describing the traffic situation along the route.

4. The method according to claim 1, wherein all performance information is determined as performance information for the at least two performance intervals, the performance information for each of the two performance intervals comprising an energy requirement for the at least one of the route sections.

5. The method according to claim 1, wherein route sections in the plurality of route sections are defined based on a minimum length, wherein the minimum length is at least 2 km.

6. The method according to claim 5, wherein route sections in the plurality of route sections are adjusted to have a length less than the minimum length when at least one exception criterion is met, and wherein said adjustment is performed based on at least one of route data and map data of a digital map.

7. The method according to claim 1, wherein the total operating strategy is determined based on the evaluation of one or more segment operating strategies for one or more segments, wherein each segment operating strategy is evaluated on the basis of at least one of a performance distribution of the segment or a total performance information value calculated based on assignment of different load points to a corresponding segment of the one or more segments, and wherein the total operating strategy is determined by selecting at least one operating mode for the corresponding segment optimizing the operation of the motor vehicle based on one or more evaluation results of the one or more segment operating strategies to reduce an energy consumption and a pollutant emission.

8. A non-transitory computer-readable storage medium comprising program code that, when executed, causes a computer to perform a function of determining a total operating strategy of a motor vehicle, comprising:

defining a plurality of route sections out of a route that is known in advance;

characterizing performance information for each route section;

assigning the performance information to the each route section;

combining successive route sections in the plurality of route sections into one or more common segments when at least one comparison criterion is met for the performance information of the successive route section;

summing the performance information of the successive route section for total performance information;

associating one or more common segments with the total performance information;

putting, in basic data, the one or more common segments associated with the total performance information;

determining a performance profile for completing the route, the performance profile including a total required performance of the motor vehicle throughout the entire route;

determining the basic data based on the performance profile required for and predictive of the operation of the motor vehicle for the route;

evaluating operating strategies of the motor vehicle based on the basic data for determination of a total operating strategy; and operating the motor vehicle according to the total operating strategy, wherein the performance information includes, in a form of a histogram, a distribution of at least one energy information required over at least two performance intervals for at least one of the route sections, wherein the at least one comparison criterion used to evaluate route sections in the plurality of route sections comprises at least one statistical variable, and wherein the statistical variable is contained in the performance information or derived from the performance information, and wherein the at least one comparison criterion comprises at least one variable representing an average performance on the route section or the at least one variable representing a maximum performance on the route section, wherein the at least one variable representing average performance or representing maximum performance is derived from performance levels and envelope in the histogram, which is provided as the distribution of the at least one energy information in the histogram.

9. The non-transitory computer-readable storage medium of claim 8, wherein the motor vehicle is a hybrid motor vehicle, and wherein determination of the total operating strategy to be employed is based on at least one of use of an electromotor and use of an internal combustion engine.

10. The non-transitory computer-readable storage medium of claim 8, wherein the computer is further configured to determine the performance profile based on at least one of driver data describing a driving conduct of a driver, and weather data and traffic data describing the traffic situation along the route.

11. The non-transitory computer-readable storage medium of claim 8, wherein the computer is further configured to determine all performance information as performance information for the at least two performance intervals, the performance information for each of the two performance intervals comprising an energy requirement for the at least one of the route sections.

12. The non-transitory computer-readable storage medium of claim 8, wherein the computer is further configured to define route sections in the plurality of route sections based on a minimum length, wherein the minimum length is at least 2 km.

13. A computer-implemented control system comprising:
at least one memory configured to be operatively coupled to at least one processor; and
the at least one processor configured to perform a function of determining a total operating strategy of a motor vehicle, the function of determining a total operating strategy of a motor vehicle comprising:
defining a plurality of route sections out of a route that is known in advance;
characterizing performance information for each route section;
assigning the performance information to the each route section;
combining successive route sections in the plurality of route sections into one or more common segments when at least one comparison criterion is met for the performance information of the successive route section;
summing the performance information of the successive route section for total performance information;
associating one or more common segments with the total performance information;
putting, in basic data, the one or more common segments associated with the total performance information;
determining a performance profile for completing the route, the performance profile including a total required performance of the motor vehicle throughout the entire route;
determining the basic data based on the performance profile required for and predictive of the operation of the motor vehicle for the route;
evaluating operating strategies of the motor vehicle based on the basic data for determination of a total operating strategy; and
operating the motor vehicle according to the total operating strategy,
wherein the performance information includes, in a form of a histogram, a distribution of at least one energy information required over at least two performance intervals for at least one of the route sections,
wherein the at least one comparison criterion used to evaluate route sections in the plurality of route sections comprises at least one statistical variable, and wherein the statistical variable is contained in the performance information or derived from the performance information, and
wherein the at least one comparison criterion comprises at least one variable representing an average performance on the route section or the at least one variable representing a maximum performance on the route section, wherein the at least one variable representing average performance or representing maximum performance is derived from performance levels and envelope in the histogram, which is provided as the distribution of the at least one energy information in the histogram.

14. The computer-implemented control system of claim 13, wherein the system is further configured to determine the performance profile based on at least one of driver data describing the driving conduct of the driver, and weather data and traffic data describing the traffic situation along the route.

15. The computer-implemented control system of claim 13, wherein the system is further configured to determine all performance information as performance information for the at least two performance intervals, the performance information for each of the two performance intervals comprising an energy requirement for the at least one of the route sections.

16. The computer-implemented control system of claim 13, wherein the system is further configured to define route sections in the plurality of route sections based on a minimum length, wherein the minimum length is at least 2 km.

* * * * *